(12) United States Patent
Kang (10) Patent No.: US 10,996,391 B2
(45) Date of Patent: May 4, 2021

(54) DISPLAY DEVICE

(71) Applicant: SAMSUNG ELECTRONICS CO., LTD., Suwon-si (KR)

(72) Inventor: Kihyung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/756,011

(22) PCT Filed: Nov. 22, 2018

(86) PCT No.: PCT/KR2018/014451
§ 371 (c)(1),
(2) Date: Apr. 14, 2020

(87) PCT Pub. No.: WO2019/117499
PCT Pub. Date: Jun. 20, 2019

(65) Prior Publication Data
US 2020/0257033 A1    Aug. 13, 2020

(30) Foreign Application Priority Data

Dec. 12, 2017    (KR) ........................ 10-2017-0169950

(51) Int. Cl.
*F21V 7/04*     (2006.01)
*F21V 8/00*     (2006.01)
*G02F 1/13357*  (2006.01)

(52) U.S. Cl.
CPC .......... *G02B 6/0031* (2013.01); *G02B 6/0028* (2013.01); *G02B 6/0063* (2013.01); *G02F 1/133615* (2013.01)

(58) Field of Classification Search
CPC .. G02B 6/0031; G02B 6/0063; G02B 6/0028; G02F 1/133615; G02F 1/1333; G02F 1/1335
(Continued)

(56) References Cited

U.S. PATENT DOCUMENTS

| 7,967,462 B2 | 6/2011 | Ogiro et al. |
| 8,643,806 B2 | 2/2014 | Yoo et al. |

(Continued)

FOREIGN PATENT DOCUMENTS

| JP | 9-219109 A | 8/1997 |
| JP | 2009-193669 A | 8/2009 |

(Continued)

OTHER PUBLICATIONS

International Search Report (PCT/ISA/210) dated Mar. 15, 2019, issued by the International Searching Authority in counterpart International Application No. PCT/KR2018/014451.
(Continued)

*Primary Examiner* — Ali Alavi
(74) *Attorney, Agent, or Firm* — Sughrue Mion, PLLC (57) ABSTRACT

A display device is disclosed. The display device comprises: a display panel; a light guide plate arranged behind the display panel so as to guide light to the display panel, and having at least one end curved away from the display panel; at least one light source for emitting light toward a surface, on which light is incident, of at least one end of the light guide plate; and at least one reflection part arranged adjacently to at least one light source so as to reflect the light toward the display panel.

10 Claims, 6 Drawing Sheets

(58) Field of Classification Search
USPC .......................................................... 362/606
See application file for complete search history.

(56) References Cited

U.S. PATENT DOCUMENTS

| | | |
|---|---|---|
| 9,759,856 B2 | 9/2017 | Jung et al. |
| 10,025,024 B2 | 7/2018 | Shim et al. |
| 10,197,719 B2 | 2/2019 | Kang et al. |
| 2009/0201668 A1 | 8/2009 | Ogiro et al. |
| 2013/0301295 A1* | 11/2013 | Iwasaki ..................... F21V 7/00 362/609 |
| 2014/0126237 A1 | 5/2014 | Morino et al. |
| 2017/0052312 A1 | 2/2017 | Jung et al. |
| 2017/0184775 A1 | 6/2017 | Kang et al. |
| 2019/0243053 A1* | 8/2019 | Ono ....................... B60K 35/00 |

FOREIGN PATENT DOCUMENTS

| | | |
|---|---|---|
| JP | 4501295 B2 | 7/2010 |
| KR | 10-2011-0111087 A | 10/2011 |
| KR | 10-2012-0019139 A | 3/2012 |
| KR | 10-1662237 B1 | 10/2016 |
| KR | 10-2017-0022494 A | 3/2017 |
| KR | 10-2017-0039022 A | 4/2017 |
| KR | 10-2017-0075896 A | 7/2017 |

OTHER PUBLICATIONS

Written Opinion (PCT/ISA/237) dated Mar. 15, 2019, issued by the International Searching Authority in counterpart International Application No. PCT/KR2018/014451.

* cited by examiner

DISPLAY DEVICE

TECHNICAL FIELD

The disclosure relates to a display device.

BACKGROUND ART

A display device displaying an image may display an image using a display panel and be used in various devices such as a television, a computer monitor and a smartphone. However, a general display device may not emit light by itself and thus require a backlight unit including a separate light source, which is disposed behind the display panel.

The backlight unit may be classified into a direct-lit type in which the light source is disposed behind the display panel to directly irradiate light to the display panel and an edge-lit type in which light is irradiated to a side surface of a light guide plate disposed behind the display panel and light incident on the light guide plate is uniformly guided to the display panel through the light guide plate.

DISCLOSURE

Technical Problem

A conventional display device including an edge-type backlight unit may be thinner than a display device including a direct-type backlight unit because a light source is disposed beside a light guide plate. However, the light source and a pixel area may require a predetermined distance therebetween to prevent a bright portion from occurring because the light source is disposed beside the light guide plate; and therefore, the display device including the edge-type backlight unit may have a wider bezel than the display device including the direct-type backlight unit.

Technical Solution

The disclosure provides a display device capable of reducing a width of a bezel and a thickness of the display device.

According to an embodiment of the disclosure, a display device may include: a display panel; a light guide plate disposed behind the display panel to guide light to the display panel and including at least one end portion curved away from the display panel; at least one light source emitting light toward a light incident surface of the at least one end portion of the light guide plate; and at least one reflector disposed adjacent to the at least one light source to reflect light toward the display panel.

The at least one light source may be disposed behind the display panel to be disposed in a pixel area of the display panel.

The at least one light source may face the light incident surface, and may be spaced apart from the light incident surface by a predetermined optical distance.

The light guide plate may include a first portion and a second portion which are respectively disposed on both sides of the light guide plate and a third portion disposed between the first portion and the second portion, and the first portion may be curved away from the display panel at the third portion and include a first light incident surface facing the at least one light source.

The display panel may include a first edge adjacent to the first portion and a second edge adjacent to the second portion, and the at least one light source may include a first light source disposed closer to the first edge than to the first light incident surface.

The at least one reflector may include a first reflector disposed adjacent to the first light source to reflect a portion of light emitted from the first light source toward the display panel, and the first reflector may include a first reflection member disposed further outside than the first light source.

A reflection surface of the first reflection member may be perpendicular to the display panel.

The first reflector may include a second reflection member disposed behind the first light source and the first light incident surface between the first light source and the first light incident surface.

The second reflection member may include at least one reflection surface reflecting light between the first light source and the first light incident surface.

The first light source may be disposed to be inclined with respect to the display panel to face the first light incident surface.

The first light source may include a first printed circuit board extending in a length direction of the first light incident surface and a plurality of light emitting elements arranged on the first printed circuit board in the length direction of the first light incident surface.

The first printed circuit board may be disposed to be inclined with respect to the display panel to face the first light incident surface.

The display device may further include a diffuser plate disposed between the display panel and the light guide plate, wherein the third portion is in contact with the diffuser plate.

The display device may further include a middle mold supporting the diffuser plate and the display panel and coupled to the first light source and the first reflector.

The display device may further include a drive circuit disposed behind the third portion.

The second portion may be curved away from the display panel at the third portion and include a second light incident surface facing the at least one light source.

The at least one light source may include a second light source disposed closer to the second edge than to the second light incident surface.

The at least one reflector may include a second reflector disposed adjacent to the second light source to reflect a portion of light emitted from the second light source toward the display panel, and the second reflector may include a third reflection member disposed further outside than the second light source.

The second reflector may include a fourth reflection member disposed between and behind the second light source and the second light incident surface.

In addition, according to another embodiment of the disclosure, a display device may include: a display panel; a light guide plate disposed behind the display panel to guide light to the display panel and including a first portion, a second portion and a third portion disposed between the first portion and the second portion; at least one light source disposed behind the display panel to be disposed in a pixel area of the display panel and emitting light toward a light incident surface of the light guide plate; and a reflector disposed adjacent to the at least one light source to reflect light toward the display panel, wherein at least one of the first portion or the second portion is curved away from the display panel at the third portion and includes the light incident surface facing the at least one light source.

BEST MODE

Hereinafter, various embodiments of the disclosure are described in detail with reference to the accompanying drawings. Embodiments to be described below are described on the basis of embodiments most appropriate for understanding technical features of the disclosure, and these embodiments do not limit the technical features of the disclosure, but exemplify that the disclosure may be implemented like these embodiments.

Therefore, the disclosure may be variously modified without departing from the technical scope of the disclosure through embodiments to be described below, and these modifications are to fall within the technical scope of the disclosure. In addition, to assist in the understanding of embodiments to be described below, related components among components performing the same operations in the respective embodiments are denoted by the same or similar reference numerals throughout the accompanying drawings. Further, the accompanying drawings are not illustrated to scale, but sizes of some of components may be exaggerated to assist in the understanding of the disclosure.

Figure 1:
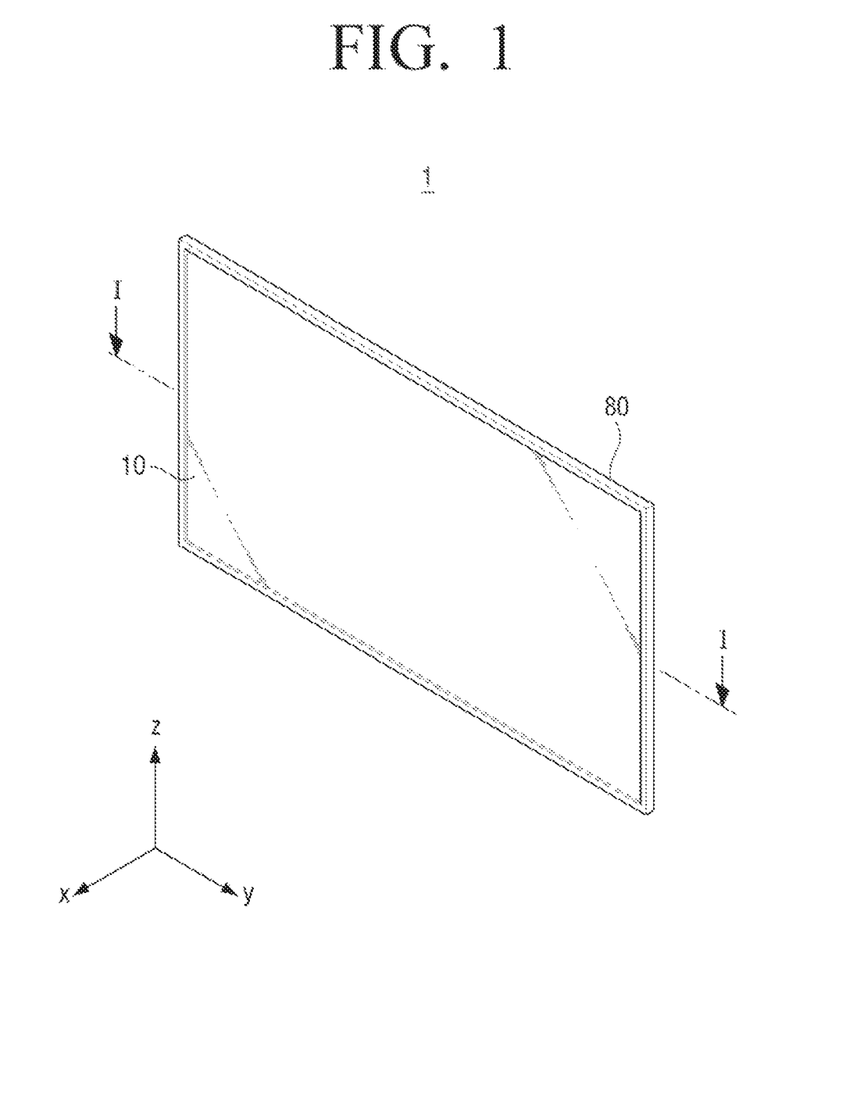
FIG. 1 is a perspective view of a display device according to an embodiment of the disclosure.
Figure 2:
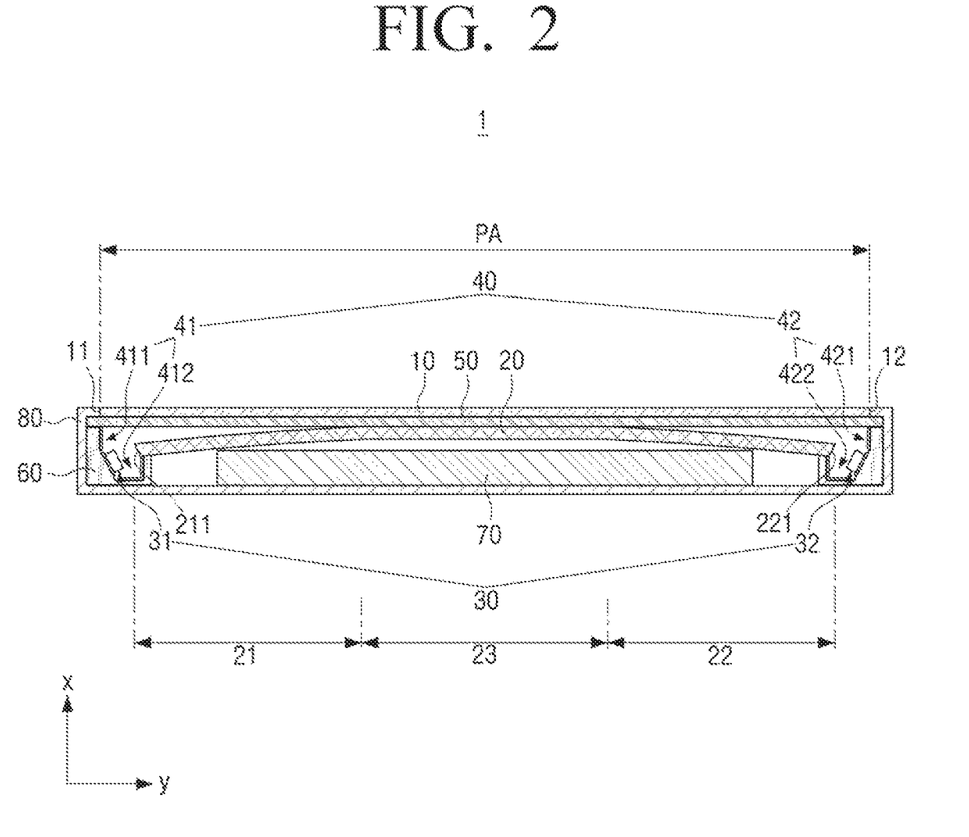
FIG. 2 is a cross-sectional view of the display device taken along line I-I of FIG. 1.

FIG. 1 is a perspective view of a display device 1 according to an embodiment of the disclosure; and FIG. 2 is a cross-sectional view of the display device taken along line I-I of FIG. 1.

The display device 1 described below may process an image signal received from an outside and visually display the processed image. The display device 1 may be implemented in various forms such as a television, a monitor, a portable multimedia device and a portable communication device, and is not limited in form as long as the device visually displays the image.

As shown in FIGS. 1 and 2, the display device 1 may include a display panel 10, a light guide plate 20, at least one light source 30, at least one reflector 40, a diffuser plate 50, a middle mold 60, a drive circuit 70 and a case 80.

The display panel 10 may display the image forward (in an X-axis direction in FIG. 1) based on the image signal input from the outside, and may be configured as a liquid crystal display (LCD) panel.

FIGS. 1 and 2 show that the display device 1 including the display panel 10 has a rectangular shape, but the shapes of the display device 1 and the display panel 10 are not limited thereto, and may be modified into various shapes.

However, the light guide plate 20, the diffuser plate 50, the middle mold 60 and the case 80 need to have shapes corresponding to the shape of the display panel 10, respectively. Hereinafter, as an example, the display panel 10 and the display device 1 have the rectangular shape.

The light guide plate 20 may be disposed behind the display panel 10 to guide light to the display panel 10.

The light guide plate 20 may have a substantially rectangular shape corresponding to the shape of the display panel 10, and irradiate a uniform surface light toward the display panel 10 through a light emitting surface facing the display panel 10.

A reflection sheet (not shown) may be coupled to a rear surface of the light guide plate 20, and the reflection sheet may reflect light moving from an inside of the light guide plate 20 toward the rear surface of the light guide plate 20 to the inside of the light guide plate 20.

The reflection sheet may be made of a material capable of reflecting light, and may be made of, for example, titanium dioxide ($TiO_2$).

The light guide plate 20 may have one or more end portions 21 and 22, which are curved away from the display panel 10, respectively.

The light guide plate 20 may be made of poly methyl methacrylate (PMMA), polycarbonate (PC) or the like.

In addition, the light guide plate 20 may have a substantially rectangular plate shape, and have some portions bent or curved to form a curved surface.

In this manner, the light guide plate 20 may include some curved portions bent toward a rear of the display device 1.

In detail, as shown in FIG. 2, the light guide plate 20 may include a first portion 21 and a second portion 22, which are respectively disposed on both sides of the light guide plate 20, and a third portion 23 disposed between the first portion 21 and the second portion 22.

Referring to FIG. 2, the first portion 21 may configure a left portion of the light guide plate 20, the second portion 22 may configure a right portion of the light guide plate 20, and the third portion 23 may configure a center portion of the light guide plate 20.

The first portion 21 and the second portion 22 may be disposed on the both sides of the light guide plate 20 to configure both end portions of the light guide plate 20. Therefore, one or more end portions 21 and 22 of the light guide plate 20 described above may refer to either at least one of the first portion 21 or the second portion 22 or both the first and second portions 21 and 22.

The first to third portions 21, 22 and 23 may divide the light guide plate 20 into three portions along its length direction (an Y-axis direction in FIG. 2), and the first to third portions 21, 22 and 23 may be sequentially run along the length direction of the light guide plate 20 without division of boundaries.

The first to third portions 21, 22 and 23 may have different lengths in various ratios.

The display panel 10 may include a first edge 11 adjacent to the first portion 21 and a second edge 12 adjacent to the second portion 22.

As shown in FIG. 2, the first edge 11 and the second edge 12 of the display panel 10 may refer to either both side surfaces of the display panel 10 or both ends of the display panel 10.

The display panel 10 may display a screen toward its front, and a pixel area PA may refer to an area displaying the screen of the display panel 10.

The pixel area PA may correspond to a display portion of the display panel 10, and a length of the pixel area PA may correspond to that of the display panel 10.

The length of the display panel 10 or the length of the pixel area PA may refer to a distance between the first edge 11 and the second edge 12.

The light guide plate 20 may have a length smaller than that of the display panel 10, and thereby the light guide plate 20 may be disposed in the pixel area PA.

Therefore, the screen may be displayed on the pixel area PA through the light irradiated from the light guide plate 20 toward the display panel 10.

The light guide plate 20 disposed in the pixel area PA may indicate that the light guide plate 20 including a length smaller than the pixel area PA is disposed behind the pixel area PA.

In addition, the first portion 21 of the light guide plate 20 may be curved away from the display panel 10 at the third portion 23.

The first portion 21 of the light guide plate 20 may include a first light incident surface 211 on which light emitted from the light source 30 may be incident.

The first light incident surface 211 may be formed at an end of the first portion 21 or one side surface of the light guide plate 20, i.e. at a side surface of the first portion 21.

The first portion 21 may be curved rearward and the first light incident surface 211 may thus be disposed behind the display panel 10 to be spaced apart from the display panel 10.

The at least one light source 30 described above may include a first light source 31, and the first light source 31 may be disposed to face the first light incident surface 211 to emit light toward the first light incident surface 211.

The first light source 31 may be disposed behind the display panel 10 to be disposed in the pixel area PA of the display panel 10.

Figure 3:
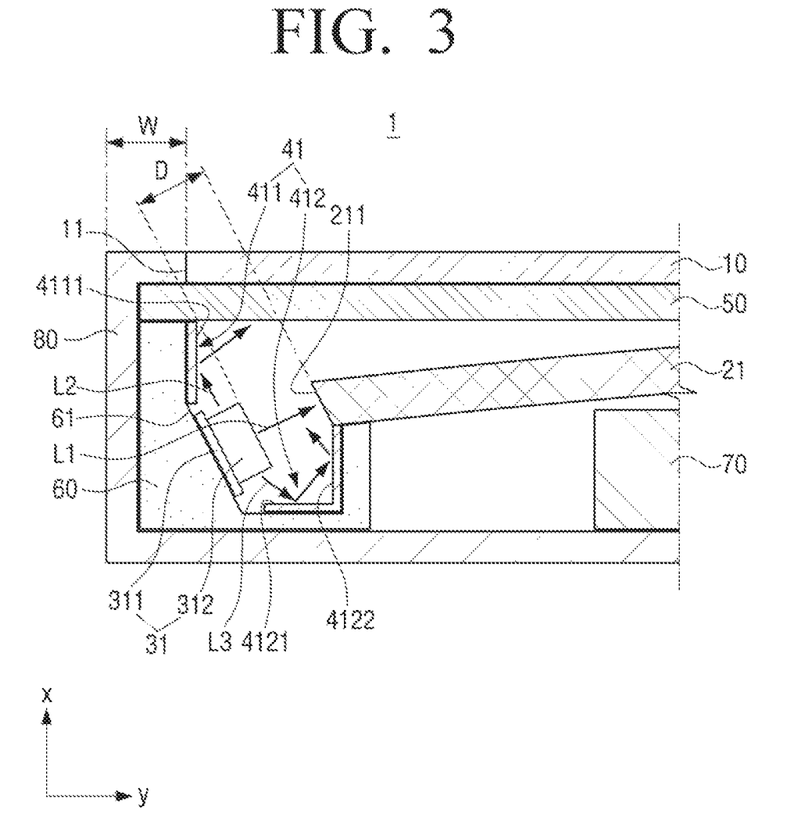
FIG. 3 is an enlarged view of the display device shown in FIG. 2 centering on a first portion of the light guide plate.

In addition, the first light source 31 facing the first light incident surface 211 may be spaced apart from the first light incident surface 211 by a predetermined optical distance D (see FIG. 3).

In this manner, the first light source 31 may be disposed behind the display panel 10 at a predetermined distance from the display panel 10 and also be spaced apart from the first light incident surface 211 by the predetermined optical distance D, thereby preventing a bright portion such as a bright spot or a bright line from occurring at a periphery of the first edge 11 adjacent to the first light incident surface 211.

In addition, the first light source 31 may be disposed spaced apart from the first light incident surface 211 by the optical distance D. A portion of light emitted from the first light source 31 may thus be incident on the first light incident surface 211; another portion of the light emitted from the first light source 31 may be irradiated toward the display panel 10; and still another portion of the light emitted from the first light source 31 may be directly irradiated toward the periphery of the first edge 11.

In this manner, it is possible to prevent a dark portion from occurring at the periphery of the first edge 11 of the display panel 10.

In addition, the at least one reflector 40 may include a first reflector 41 disposed adjacent to the first light source 31 and the first reflector 41 may reflect light toward the display panel 10, thereby preventing the dark portion from occurring at the periphery of the first edge 11 of the display panel 10.

As such, the light guide plate 20 may have the portion curved away from the display panel 10. A light source 30 irradiating light onto the light incident surface of the light guide plate 20 may thus be disposed behind the display panel 10, and the light source 30 may be disposed in the pixel area PA of the display panel 10.

In this manner, it is possible to reduce a width of a bezel (see 'W' in FIG. 3) surrounding the edge of the display panel 10.

Described below is a structure for preventing the bright portion and the dark portion from occurring at the periphery of the first edge 11 by the first portion 21 of the curved light guide plate 20 and the first reflector 41.

As shown in FIG. 2, the second portion 22 of the light guide plate 20 may also be curved away from the display panel 10 at the third portion 23.

The second portion 22 of the light guide plate 20 may include a second light incident surface 221 on which the light emitted from the light source 30 may be incident.

The second light incident surface 221 may be formed at an end of the second portion 22 or the other side surface of the light guide plate 20, i.e. at a side surface of the second portion 22.

The second portion 22 may be curved rearward, and the second light incident surface 221 may thus be disposed behind the display panel 10 to be spaced apart from the display panel 10.

The at least one light source 30 described above may further include a second light source 32, and the second light source 32 may be disposed to face the second light incident surface 221 to emit light toward the second light incident surface 221.

In this manner, the light emitted from the first and second light sources 31 and 32 respectively disposed beside the light guide plate 20 may be incident into the light guide plate 20 through the first and second light incident surfaces 211 and 221 of the light guide plate 20, respectively, thereby increasing amount of the surface light irradiated from the light guide plate 20 toward the display panel 10.

The second light source 32 may be disposed behind the display panel 10 to be disposed in the pixel area PA of the display panel 10.

In addition, the second light source 32 facing the second light incident surface 221 may be spaced apart from the second light incident surface 221 by the predetermined optical distance D.

In this manner, the second light source 32 may be disposed behind the display panel 10 at the predetermined distance from the display panel 10 and also be spaced apart from the second light incident surface 221 by the predetermined optical distance, thereby preventing the bright portion from occurring at a periphery of the second edge 21 adjacent to the second light incident surface 221. In addition, a portion of the light emitted from the second light source 32 may be directly irradiated toward the periphery of the second edge 21, thereby preventing the dark portion from occurring at the periphery of the second edge 21 of the display panel 10.

In addition, the at least one reflector 40 may include a second reflector 42 disposed adjacent to the second light source 32 and the second reflector 42 may reflect the light toward the display panel 10, thereby preventing the dark portion from occurring at the periphery of the second edge 21 of the display panel 10.

As described above, the first and second light sources 31 and 32 may be disposed in the pixel area PA of the display panel 10, thereby reducing the width of the bezel surrounding the display panel 10.

The diffuser plate 50 may be disposed between the display panel 10 and the light guide plate 20.

The diffuser plate 50 may be in contact with a rear surface of the display panel 10.

In addition, the third portion 23 of the light guide plate 20 may be in contact with the diffuser plate 50, thereby reducing a thickness of the display device 1.

In addition, the drive circuit 70 may be disposed behind the third portion 23 of the light guide plate 20.

The drive circuit 70 may include a processor (not shown) controlling the display device 1, a power supplier (not shown) supplying power to the display device 1 and the like, and may be configured to have a printed circuit board and a plurality of electronic components mounted on the printed circuit board. The electronic components of the drive circuit 70 may include a microprocessor, a microcomputer, a central processing unit (CPU), a battery, a passive component and the like, and may be configured to have various kinds of electronic components.

As such, the drive circuit 70 may be disposed in a space behind the light guide plate 20 including the first portion 21 and the second portion 22 which are curved toward a rear of the light guide plate 20, thereby efficiently utilizing an inner space of the display device 1 to reduce the thickness of the display device 1.

In addition, the display device 1 may include the middle mold 60 supporting the diffuser plate 50 and the display panel 10 and the case 80 configuring a rear surface portion of the display device 1.

The case 80 may be disposed behind the display panel 10 to surround a circumference of the display panel 10, and the followings may be disposed in the case 80: the display panel 10, the light guide plate 20, the light source 30, the reflector 40, the diffuser plate 50, the middle mold 60 and the drive circuit 70.

The bezel may refer to a portion of the case 80 surrounding the circumference of the display panel 10.

The case 80 may form the rear surface portion of the display device 1 to protect the various components disposed therein.

The case 80 may be formed in a rectangular ring shape not to expose an edge portion of the display panel 10 to the outside, and may include a top chassis (not shown) including a shape of the rectangular ring surrounding the display panel 10 and a back chassis (not shown) to form a side appearance and a rear appearance of the display device 1.

The top chassis may be the bezel surrounding the display panel 10.

As shown in FIG. 2, the middle mold 60 may be disposed in the case 80.

The middle mold 60 may be in contact with the diffuser plate 50 to support the diffuser plate 50 and may support the display panel 10 by supporting the diffuser plate 50.

The middle mold 60 may have a substantially rectangular ring-shaped frame formed along a circumference of the diffuser plate 50.

In this manner, the middle mold 60 may stably support the diffuser plate 50 along the circumference of the diffuser plate 50.

In addition, the middle mold 60 may support the rear surface of the light guide plate 20 and may support rear surfaces of the first and second portions 21 and 22.

In addition, the middle mold 60 may be coupled to the first and second portions 21 and 22 of the light guide plate 20.

In addition, the first light source 31 and the first reflector 41 may be coupled to the middle mold 60.

The first light source 31 and the first reflector 41 may be coupled to one side surface of the middle mold 60 corresponding to the first edge 11 and the first light incident surface 211 of the display panel 10, respectively, and thus be fixedly disposed by the middle mold 60.

In addition, the second light source 32 and the second reflector 42 may also be coupled to the other side surface of the middle mold 60 corresponding to the second edge 12 and the second light incident surface 221 of the display panel 10, respectively, and thus be fixedly disposed by the middle mold 60.

FIG. 3 is an enlarged view of the display device 1 shown in FIG. 2 centering on the first portion 21 of the light guide plate 20.

Hereinafter, referring to FIG. 3, the description focuses on the first portion 21 curved away from the display panel 10 and a structure for preventing the bright portion and the dark portion from occurring at the periphery of the first edge 11 by the first reflector 41.

The second portion 22 of the light guide plate 20 shown in FIG. 2 is disposed symmetrical with the first portion 21, the second light source 32 is disposed symmetrical with the first light source 31, and the second reflector 42 also has a disposition structure symmetrical with that of the first reflector 41. Therefore, the descriptions of the second portion 22, second light source 32 and second reflector 42 of the light guide plate 20 are replaced with those of the first portion 21, the first light source 31 and the second reflector 41, shown in FIG. 3.

As shown in FIG. 3, the first light source 31 may face the first light incident surface 211 of the first portion 21 of the light guide plate 20, and may be disposed spaced apart from the first light incident surface 211 by the predetermined optical distance D.

The first light source 31 may be disposed closer to the first edge 11 of the display panel 10 than to the first light incident surface 211.

In addition, the first light source 31 may be disposed inclined to face the first light incident surface 211.

In detail, the first portion 21 of the light guide plate 20 may be curved away from the display panel 10, and the first light incident surface 211 may thus be disposed to be inclined with respect to the display panel 10.

Accordingly, the first light source 31 may be disposed to be inclined with respect to the display panel 10 to face the first light incident surface 211.

In more detail, the first light source 31 may include a first printed circuit board 311 extending in a length direction (a Z-axis direction in FIG. 1) of the first light incident surface 211 and a plurality of light emitting elements 312 arranged on the first printed circuit board 311 in the length direction of the first light incident surface 211.

The plurality of light emitting elements 312 may be arranged in the length direction of the first light incident surface 211, thereby irradiating light to the first light incident surface 211.

Accordingly, a portion L1 of the light emitted from the first light source 31 may be irradiated to the first light incident surface 211 facing the first light source 31. Most of the light emitted from the first light source 31 may be irradiated to the first light incident surface 211.

The plurality of light emitting elements 312 may include a light emitting diode (LED), a cold cathode fluorescent lamp (CCFL), an external electrode fluorescent lamp (EEFL), a laser diode (LD) or the like.

As described above, the first light source 31 and the first light incident surface 211 may be spaced apart from each other by the predetermined optical distance D, and the light emitting elements 312 and the first light incident surface 211 may thus be spaced apart from each other by the optical distance D.

In addition, the first printed circuit board 311 may be disposed to be inclined with respect to the display panel 10 to face the first light incident surface 211, and thereby the plurality of light emitting elements 312 arranged on the first printed circuit board 311 may emit light facing the first light incident surface 211.

To this end, the middle mold 60 may include an inclined surface 61 coupled to the first printed circuit board 311 so that the first printed circuit board 311 is inclined, and the inclined surface 61 may extend in the length direction of the first light incident surface 211.

In addition, the first reflector 41 may include a first reflection member 411 and a second reflection member 412, which are disposed adjacent to the first light source 31.

As described above, the first light source 31 may be spaced apart from the first light incident surface 211 by the optical distance D. Therefore, the portion L1 of the light emitted from the first light source 31 may be incident directly to the first light incident surface 211, and other portions L2 and L3 of the light emitted from the first light source 31 may be diffused between the first light source 31 and the first light incident surface 211.

In addition, another portion of the light emitted from the first light source 31 may be directly irradiated to the display panel 10 through the first light source 31 and the first light incident surface 211, and still another portion of the light emitted from the first light source 31 may be irradiated toward the periphery of the first edge 11 between the first light source 31 and the first light incident surface 211.

The first reflection member 411 may be disposed further outside than the first light source 31 to reflect the portion L2 of the light emitted from the first light source 31 toward the display panel 10.

In detail, the first reflection member 411 may be disposed closer to the outside of the display device 1 than the first light source 31, thereby reflecting the light L2 emitted from the first light source 31 toward the outside.

In addition, as shown in FIG. 3, a reflection surface 4111 of the first reflection member 411 may be perpendicular to the display panel 10, thereby reflecting light incident to the first reflection member 411 toward the periphery of the first edge 11 of the display panel 10.

In addition, the first reflector 41 may include the second reflection member 412 disposed between and behind the first light source 31 and the first light incident surface 211.

The second reflection member 412 may reflect the light L3 irradiated toward the rear of the display device 1 among the light emitted from the first light source 31.

In detail, the second reflection member 412 may include one or more reflection surfaces 4121 and 4122, which reflect the light L3 irradiated from the first light source 31 toward the rear of the display device 1 between the first light source 31 and the first light incident surface 211.

The second reflection member 412 may include the first reflection surface 4121 and the second reflection surface 4122 disposed at a predetermined angle with respect to the first reflection surface 4121.

For example, the light L3 irradiated toward the rear of the display device 1 from the first light source 31 may be reflected by the first reflection surface 4121 disposed in parallel to the display panel 10, then may be reflected by the second reflection surface 4122 disposed perpendicular to the first reflection surface 4121, and may pass through between the first light source 31 and the first light incident surface 211 to move toward the display panel 10.

As such, portions L2 and L3 of the light emitted from the first light source 31 may be reflected toward the display panel 10 through the first and second reflection members 411 and 412. In detail, the portions L2 and L3 of the light emitted from the first light source 31 may be reflected to the periphery of the first edge 11 through the first and second reflection members 411 and 412.

As such, the first light source 31 of the disclosure in a state of being disposed in the pixel area PA of the display panel 10 may be spaced apart from the first light incident surface 211 of the first portion 21 of the light guide plate 20 which is curved away from the display panel 10 by the predetermined optical distance D, thereby preventing the bright portion from occurring at the periphery of the first edge 11.

In addition, the display device 1 of the disclosure may reflect light toward the periphery of the first edge 11 of the display panel 10 through the first reflector 41 including the first and second reflection members 411 and 412, thereby preventing the dark portion from occurring at the periphery of the first edge 11.

In addition, the first portion 21 of the light guide plate 20 may be curved rearward, and the first light source 31 may be disposed behind the display panel 10 to be disposed in the pixel area PA of the display panel 10, thereby reducing the width of the bezel of the display device 1, i.e. a width of a bezel of the case 80.

As described above, the second portion 22, second light source 32 and second reflector 42 of the light guide plate 20, which are shown in FIG. 2, may respectively have the structures symmetrical with those of the first portion 21, first light source 31 and first reflector 41 of the light guide plate 20, which are described above, and may prevent the bright portion and the dark portion from occurring at the periphery of the second edge 12 of the display panel 10.

The second light source 32 may be disposed closer to the second edge 12 of the display panel 10 than to the second light incident surface 221.

In addition, the second reflector 42 may include a third reflection member 421 and a fourth reflection member 422, which are disposed adjacent to the second light source 32.

The third reflection member 421 may be disposed closer to the outside of the display device 1 than the second light source 32 to reflect the light emitted outward from the second light source 32 toward the second edge 12 of the display panel 10.

In addition, the fourth reflection member 422 may be disposed between and behind the second light source 32 and the second light incident surface 221 and include at least one reflection surface, thereby reflecting the light emitted from the second light source 32 toward the rear of the display device 1 toward the periphery of the second edge 12 of the display panel 10.

Figure 4:
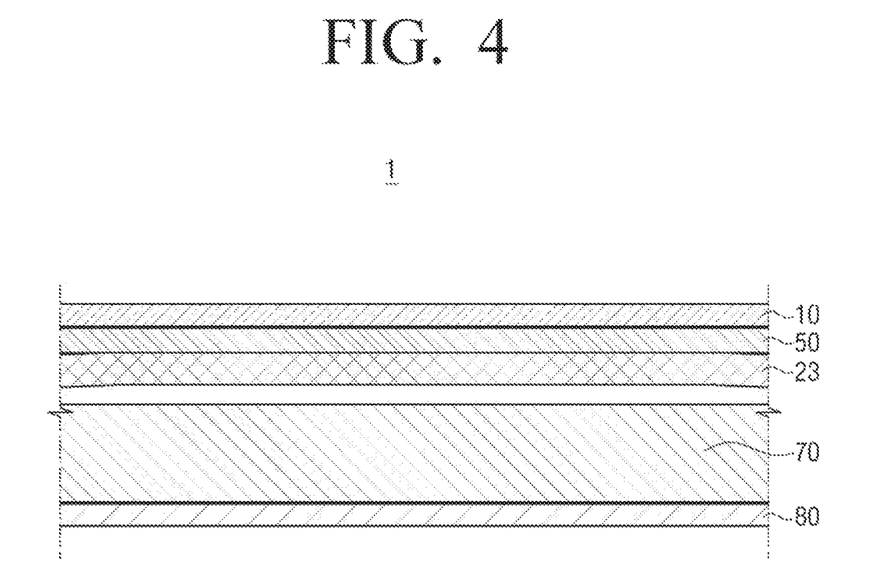
FIG. 4 is an enlarged view of the display device shown in FIG. 2 centering on a third portion of the light guide plate.

FIG. 4 is an enlarged view of the display device 1 shown in FIG. 2 centering on the third portion 23 of the light guide plate 20.

As described above, the third portion 23 of the light guide plate 20 may be in contact with the diffuser plate 50, and the first portion 21 and the second portion 22 connected to the third portion 23 may be curved away from the display panel 10, respectively.

In addition, the drive circuit 70 may be disposed in the space formed behind the curved light guide plate 20, thereby efficiently utilizing the inner space of the display device 1 to reduce the thickness of the display device 1.

Figure 5:
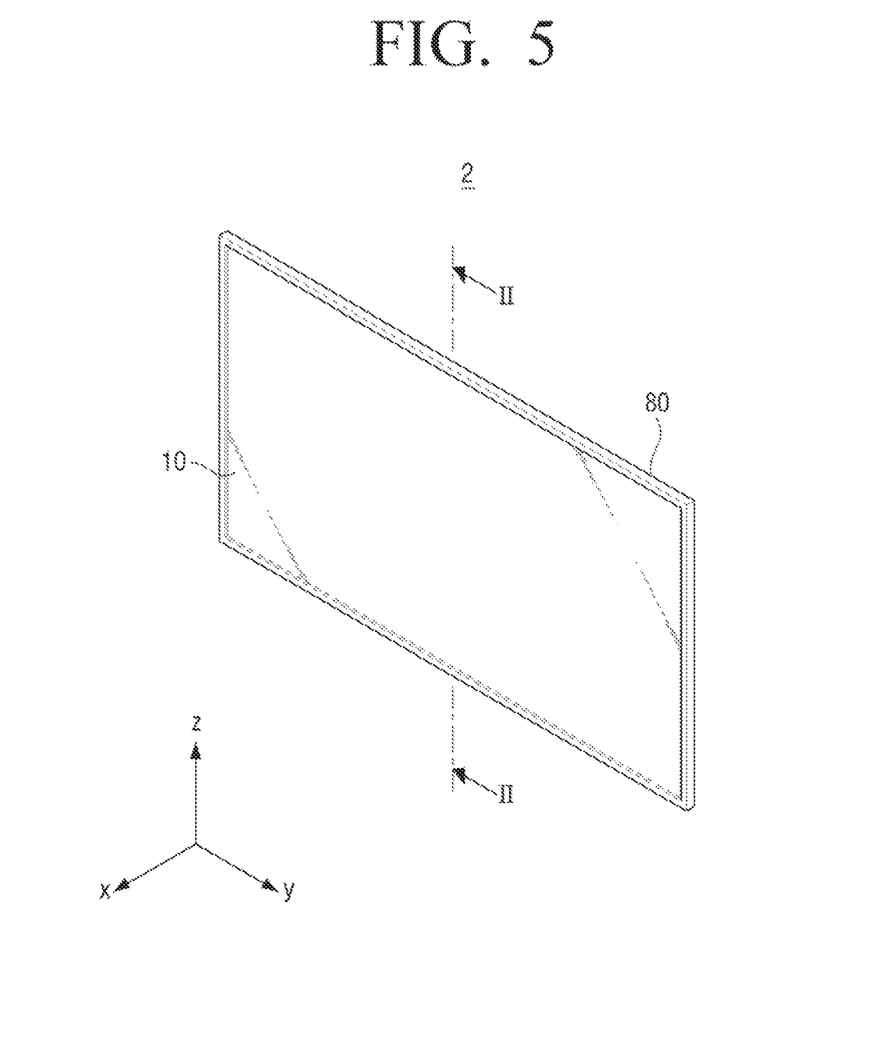
FIG. 5 is a perspective view of a display device according to another embodiment of the disclosure.
Figure 6:
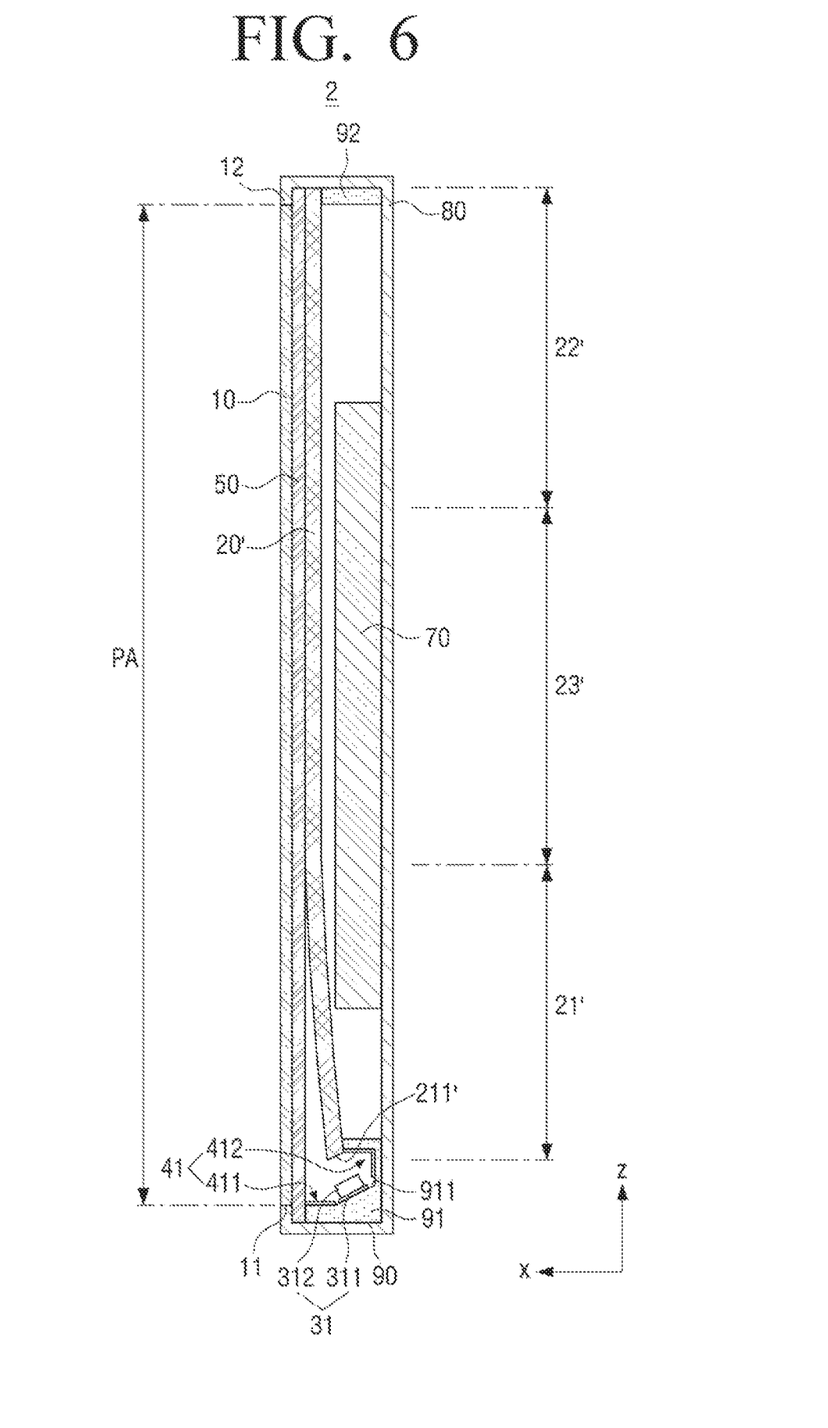
FIG. 6 is a cross-sectional view of the display device taken along line II-II of FIG. 5.

FIG. 5 is a perspective view of a display device 2 according to another embodiment of the disclosure; and FIG. 6 is a cross-sectional view of the display device 2 taken along line II-II of FIG. 5.

The display device 2 according to another embodiment of the disclosure has a configuration almost the same as that of the display device 1 shown in FIGS. 1 to 4. The description thus omits a redundant explanation thereof and hereinafter focuses on a structure of a light guide plate 20', a first light source 31 and a middle mold 90, which is different from that of the display device 1 according to an embodiment of the disclosure.

Referring to FIGS. 5 and 6, the display device 2 may include a display panel 10, the light guide plate 20', the first light source 31, a first reflector 41, a diffuser plate 50, the middle mold 90, a drive circuit 70 and a case 80.

The display device 1 according to an embodiment of the disclosure described above may have a structure in which the first and second light sources 31 and 32 are respectively disposed beside the light guide plate 20 referring to FIGS. 1 and 2. On the contrary, the display device 2 according to another embodiment of the disclosure is different from the display device 1 in including a structure in which the single first light source 31 is disposed below the light guide plate 20'.

In addition, the light guide plate 20' may include a first portion 21' and a second portion 22', which are disposed on a lower side and an upper side of the light guide plate, respectively, and a third portion 23' disposed between the first portion 21' and the second portion 22'.

Referring to FIG. 6, the first portion 21' may configure a lower portion of the light guide plate 20', the second portion 22' may configure an upper portion of the light guide plate 20, and the third portion 23' may configure a center portion of the light guide plate 20.

In addition, the display panel 10 may include a first edge 11 adjacent to the first portion 21' and a second edge 12 adjacent to the second portion 22'.

As shown in FIG. 6, the first edge 11 and the second edge 12 of the display panel 10 may refer to a top surface and a bottom surface of the display panel 10 or a top end and a bottom end of the display panel 10, respectively.

The first portion 21' of the light guide plate 20' may be curved away from the display panel 10 at the third portion 23'.

That is, the first portion 21' connected downward to the third portion 23' of the light guide plate 20' may be curved toward a rear of the display device 2.

The first portion 21' of the light guide plate 20' may include a first light incident surface 211' on which light emitted from the first light source 31 may be incident.

The first light incident surface 211' may be formed at a bottom end of the first portion 21' and a bottom surface of the light guide plate 20', i.e. at a bottom surface of the first portion 21'.

The first portion 21' of the light guide plate 20' may be curved rearward and the first light incident surface 211' may thus be disposed behind the display panel 10 to be spaced apart from the display panel 10.

In addition, the first light source 31 may face the first light incident surface 211' and be spaced apart from the first light incident surface 211' by a predetermined optical distance D.

In addition, the first reflector 41 may be disposed adjacent to the first light source 31 and include first and second reflection members 411 and 412.

Through this structure, the display panel 2 may prevent a dark portion and a bright portion from occurring at a periphery of the first edge 11.

However, the above-described structure of the first portion 21', first light source 31 and first reflector 41 of the light guide plate 20' is a structure in which the first portion 21, first light source 31 and first reflector 41 of the light guide plate 20, shown in FIG. 3, are respectively rotated by 90 degrees. Therefore, each corresponding component has the same structure and function.

The second portion 22' and the third portion 23' of the light guide plate 20' may be in contact with a rear surface of the diffuser plate 50.

That is, the second portion 22' according to another embodiment of the disclosure may not be curved away from the display panel 10, and may be formed in a flat shape parallel to the display panel 10.

The middle mold 90 may be in contact with the diffuser plate 50 to support the diffuser plate 50 and support the display panel 10 by supporting the diffuser plate 50.

In addition, the middle mold 90 may support a rear surface of the light guide plate 20 and support rear surfaces of the first and second portions 21' and 22'.

In detail, the middle mold 90 may include a lower portion 91 and an upper portion 92, and the first light source 31 and the first reflector 41 may be coupled to the lower portion 91 of the middle mold 90.

In addition, a separate light source or reflector is not disposed on the upper portion 92 of the middle mold 90. Therefore, as shown in FIG. 6, the upper portion 92 of the middle mold 90 may have a shape of a rod disposed between a bottom surface of the case 80 and the light guide plate 20'.

As such, in the display device 2 according to another embodiment of the disclosure, the first portion 21' of the light guide plate 20' may be curved away from the display panel 10 and the first light source 31 may be disposed in a pixel area PA of the display panel 10, thereby reducing a width of a bezel; the first light source may be spaced apart from the first light incident surface 211' by the optical distance D, thereby preventing the bright portion from occurring at the periphery of the first edge 11; and the first reflector 41 may prevent the dark portion from occurring at the periphery of the first edge 11.

In the above-described display devices 1 and 2 of the disclosure, the one or more ends 21, 22 and 21' of the light guide plates 20 and 20' may be curved away from the display panel 10; and the light source 30 may be disposed in the pixel area PA of the display panel 10, the light source 30 being spaced apart from the light incident surfaces 211, 221 and 211' of the one or more ends 21, 22 and 21' of the light guide plates 20 and 20' by the predetermined optical distance D, and facing the light incident surfaces 211, 221 and 211'. In this manner, it is possible to reduce the width of the bezel of the display device 1 and 2 and to prevent the bright portion or the dark portion from occurring at the edges of the display panel 10.

Although the diverse embodiments of the disclosure are individually described hereinabove, the respective embodiments are not necessarily implemented singly, and may also be implemented so that configurations and operations thereof are combined with those of one or more other embodiments.

In addition, although the embodiments of the disclosure are shown and described hereinabove, the disclosure is not limited to the above-mentioned specific embodiments, but may be variously modified by those skilled in the art to which the disclosure pertains without departing from the scope and spirit of the disclosure as disclosed in the accompanying claims. These modifications also need to be understood to fall within the scope of the disclosure.

The invention claimed is:

1. A display device comprising:
   a display panel;
   a light guide plate disposed behind the display panel configured to guide light to the display panel and including at least one end portion curved away from the display panel;

at least one light source emitting light toward a light incident surface of the at least one end portion of the light guide plate; and at least one reflector disposed adjacent to the at least one light source to reflect light toward the display panel, wherein the at least one light source is disposed behind the display panel to be disposed in a pixel area of the display panel, the at least one light source faces the light incident surface, and is spaced apart from the light incident surface by a predetermined optical distance, the light guide plate includes a first portion and a second portion which are respectively disposed on both sides of the light guide plate and a third portion disposed between the first portion and the second portion, the first portion is curved away from the display panel at the third portion and includes a first light incident surface facing the at least one light source, the display panel includes a first edge adjacent to the first portion and a second edge adjacent to the second portion, the at least one light source includes a first light source disposed closer to the first edge than to the first light incident surface, and the first light source is disposed to be inclined with respect to the display panel to face the first light incident surface.

2. The display device as claimed in claim 1, wherein the at least one reflector includes a first reflector disposed adjacent to the first light source to reflect a portion of light emitted from the first light source toward the display panel, and the first reflector includes a first reflection member disposed further outside than the first light source.

3. The display device as claimed in claim 2, wherein a reflection surface of the first reflection member is perpendicular to the display panel.

4. The display device as claimed in claim 2, wherein the first reflector includes a second reflection member disposed between and behind the first light source and the first light incident surface.

5. The display device as claimed in claim 2 further comprising a diffuser plate disposed between the display panel and the light guide plate, wherein the third portion is in contact with the diffuser plate.

6. The display device as claimed in claim 1, wherein the second portion is curved away from the display panel at the third portion and includes a second light incident surface facing the at least one light source.

7. The display device as claimed in claim 6, wherein the at least one light source includes a second light source disposed closer to the second edge than to the second light incident surface.

8. The display device as claimed in claim 7, wherein the at least one reflector includes a second reflector disposed adjacent to the second light source to reflect a portion of light emitted from the second light source toward the display panel, and the second reflector includes a third reflection member disposed further outside than the second light source.

9. The display device as claimed in claim 8, wherein the second reflector includes a fourth reflection member disposed between and behind the second light source and the second light incident surface.

10. A display device comprising:

a display panel;

a light guide plate disposed behind the display panel to guide light to the display panel and including a first portion, a second portion and a third portion disposed between the first portion and the second portion;

at least one light source disposed behind the display panel to be disposed in a pixel area of the display panel and emitting light toward a light incident surface of the light guide plate; and a reflector disposed adjacent to the at least one light source to reflect light toward the display panel, wherein at least one of the first portion or the second portion is curved away from the display panel at the third portion and includes the light incident surface facing the at least one light source, and wherein the at least one light source is disposed behind the display panel to be disposed in a pixel area of the display panel, the at least one light source faces the light incident surface, and is spaced apart from the light incident surface by a predetermined optical distance, the light guide plate includes a first portion and a second portion which are respectively disposed on both sides of the light guide plate and a third portion disposed between the first portion and the second portion, the first portion is curved away from the display panel at the third portion and includes a first light incident surface facing the at least one light source, the display panel includes a first edge adjacent to the first portion and a second edge adjacent to the second portion, the at least one light source includes a first light source disposed closer to the first edge than to the first light incident surface, and the first light source is disposed to be inclined with respect to the display panel to face the first light incident surface.

* * * * *